United States Patent [19]

Daigle et al.

[11] 4,017,462

[45] Apr. 12, 1977

[54] TREATMENT OF ORGANIC TEXTILES WITH ADDUCT POLYMERS AND PHENOLS

[75] Inventors: Donald J. Daigle, New Orleans; Armand B. Pepperman, Jr., Metairie; Sidney L. Vail, River Ridge, all of La.

[73] Assignee: The United States of America as represented by the Secretary of Agriculture, Washington, D.C.

[22] Filed: Mar. 4, 1976

[21] Appl. No.: 663,886

Related U.S. Application Data

[62] Division of Ser. No. 499,806, Aug. 22, 1974, Pat. No. 3,961,110.

[52] U.S. Cl. .................. 260/72 R; 106/15 FP; 252/8.1; 260/606.5 F; 260/606.5 P; 260/943; 260/DIG. 24; 427/390 D; 427/392

[51] Int. Cl.$^2$ .................. C08G 12/04; C09D 5/18; C09K 3/28

[58] Field of Search ........ 260/72, 606.5 P, 606.5 F, 260/DIG. 24, 943; 106/15 FP; 252/8.1

[56] References Cited

UNITED STATES PATENTS

| | | | |
|---|---|---|---|
| 2,995,551 | 8/1961 | Reuter et al. | 260/249.6 |
| 3,369,056 | 2/1968 | Schwarzer | 260/838 |
| 3,374,292 | 3/1968 | Zahir | 260/943 |
| 3,491,064 | 1/1970 | Enders et al. | 260/72 R |
| 3,535,278 | 10/1970 | Oertel et al. | 260/72 R X |
| 3,658,791 | 4/1972 | Tesoro et al. | 260/72 R X |
| 3,674,854 | 7/1972 | Starnes | 260/606.5 F |
| 3,698,854 | 10/1972 | Donaldson et al. | 8/116 P |
| 3,745,191 | 7/1973 | Daigle et al. | 260/606.5 P |
| 3,763,108 | 10/1973 | Chang et al. | 260/72 R |
| 3,784,356 | 1/1974 | Wagner | 8/196 |
| 3,819,580 | 6/1974 | Daigle et al. | 260/DIG. 24 X |
| 3,823,124 | 7/1974 | Chang et al. | 260/72 R X |
| 3,868,269 | 2/1975 | Daigle et al. | 117/136 |

OTHER PUBLICATIONS

Chem. Abs. 60:5651f; P12230a; 67:P74150d.

*Primary Examiner*—Murray Tillman
*Assistant Examiner*—T. DeBenedictis, Sr.
*Attorney, Agent, or Firm*—M. Howard Silverstein; Salvador J. Cangemi; David G. McConnell

[57] ABSTRACT

Phosphorus- and nitrogen-containing polymers, solubilized by hydroxymethylphosphonium salts and formaldehyde, were allowed to react with phenol, alkyl substituted phenols, or halogen substituted phenols which contain one or more hydrogens ortho or para to the phenolic hydroxyl group to (a) prepare flame-resistant polymers and (b) prepare flame-, glow-, wrinkle-, and shrink-resistant woven and knit textiles which contain 25% or more cellulosic fibers.

2 Claims, No Drawings

TREATMENT OF ORGANIC TEXTILES WITH ADDUCT POLYMERS AND PHENOLS

This is a division of application Ser. No. 499,806, filed Aug. 22, 1974 now U.S. Pat. No. 3,961,110.

This invention relates to new phosphorus, nitrogen, and halogen containing polymers and to their use in the production of flame-resistant organic fibrous materials. More specifically, it deals with the reaction of phenols or substituted phenols with products prepared by solubilizing phosphorus- and nitrogen-containing polymers with hydroxymethyl phosphonium salts to produce insoluble polymers (or precipitates) and flame-resistant organic fibrous products when these insoluble polymers are formed in or on the fibrous materials.

As employed throughout the specifications and claims of this invention the term "adduct polymer" refers to the product formed by solubilizing unoxidized phosphorus- and nitrogen-containing polymers in solutions containing formaldehyde and a hydroxymethylphosphonium salt. The chemistry involved in the solution of these polymers by the addition of formaldehyde and a hydroxymethylphosphonium salt is not known, but it is believed that chemical reactions occur which modify the polymers by altering the chain length and/or by addition of the reactants to the polymer or products therefrom. The abbreviation THP refers to the compound tris(hydroxymethyl)phosphine, $(HOCH_2)_3P$. The term tetrakis(hydroxymethyl)phosphonium salt refers to that class of compounds in which four hydroxymethyl groups are bonded to a phosphorus atom which is in the phosphonium state, thus having a plus charge associated with it and the anion can be the anion of any organic or inorganic acid such as acetic, oxalic, hydrochloric, or phosphonic. The term Thpc refers to the compound tetrakis(hydroxymethyl)phosphonium chloride. The term tetrakis(hydroxymethyl)phosphonium hydroxide or THPOH refers to a solution prepared by neutralizing any tetrakis(hydroxymethyl)phosphonium salt with any suitable base, inorganic or organic, such as sodium hydroxide or triethanolamine.

Copending application filed Aug. 22, 1974 Ser. No. 499,803, now U.S. Pat. No. 3,953,165, relates to the production of soluble adduct polymers and to the use of these polymers with certain nitrogenous compounds for the treatment of organic fibrous materials in either a heat cure or chemical cure procedure for the production of flame resistant organic fibrous textiles. These polymers were solubilized by the use of formaldehyde and a hydroxymethylphosphonium salt.

Copending application filed Aug. 22, 1974 Ser. No. 499,804, now U.S. Pat. No. 3,953,166, relates to the production of soluble adduct polymers and the use of these polymers with phenols and substituted phenols for the treatment of organic fibrous materials for the production of flame resistant organic fibrous materials. These adduct polymers were solubilized by formaldehyde and an acid, such as acetic or hydrochloric.

Copending application filed Aug. 22, 1974 Ser. No. 499,807, now U.S. Pat. No. 3,975,560, relates to the production and use of soluble adduct polymers and to the use of these polymers with certain nitrogen compounds for the treatment of organic fibrous materials in either a heat cure or chemical cure procedure for the production of flame-resistant organic fibrous textiles. These adduct polymers were solubilized by formaldehyde and an acid, such as acetic or hydrochloric.

A primary object of the present invention is to produce flame-resistant polymers and flame-resistant organic fibrous materials.

Polymers of various types can be prepared by reacting tetrakis(hydroxymethyl)phosphonium salts, tris(hydroxymethyl)phosphine or tetrakis(hydroxymethyl)phosphonium hydroxide with ammonia, diamines, such as ethylene diamine and 1,6-hexamethylenediamine, or hexamethylene tetramine.

We have discovered that these aforementioned adduct polymers react with phenol and substituted phenols, including halogenated phenols, which contain one or more hydrogen atoms attached to ring carbons at the ortho or para positions to the phenolic hydroxyl groups to produce thermosetting or insoluble flame-resistant polymers.

More specifically, the products and processes of our invention may be described as follows: (1) insoluble polymers are prepared by reacting THP either in the presence of formaldehyde or not with ammonia, diamines or hexamethylenetetramine or mixtures of these. Insoluble polymers may also be prepared by utilizing tetrakis(hydroxymethyl)phosphonium salts or hydroxide in lieu of THP. The mole ratio may vary from 1:4 to 4:1 of amine to phosphorus compound. The preferred mole ratio is 1:1 with THP and tetrakis(hydroxymethyl)phosphonium hydroxide and 2:1 with tetrakis(hydroxymethyl)phosphonium chloride. (2) To produce clear solutions of these polymers, the polymer is mixed with formalin solution and a tetrakis(hydroxymethyl)phosphonium salt. The ratio of formaldehyde added to phosphorus contained in the polymer can vary from 1:4 to 4:1. The preferred ratio is 1:1. The ratio of phosphonium salt added to the phosphorus contained in the polymer can vary from 1:10 to 2:1. The preferred ratio is 1:1. (3) The phenolic or halogen substituted phenolic compound is allowed to react with the adduct polymer to produce thermosetting or insoluble polymers in accordance with this invention. The reaction is carried out by dissolving the phenolic or halogen substituted phenolic compound in a suitable medium, adding this solution to a solution containing the adduct polymers and then heating as needed until a viscous solution and finally a polymer is produced. Polymers produced by this process are insoluble, thermosetting and flame resistant. (4) To produce flame-resistant organic textiles, the textile structure is wetted with a solution containing the adduct polymer and the phenolic or halogenated phenolic compound which contains one or more hydrogens ortho or para to the phenolic hydroxyl group, then drying and heating the textile at a temperature ranging from 90° to 170° C for a period of time necessary to promote reaction of the adduct polymer solution and the phenolic or halogenated phenolic compound within or on the textile structure Phenolic compounds suitable for use in making the products of this invention include phenol, o-cresol, m-cresol, p-cresol, catechol, resorcinol, hydroquinone, and phloroglucinol. Halogenated phenolic compounds suitable for use in making the products of this invention include o-bromophenol, m-bromophenol, p-bromophenol, o-phenetole, halophenylphenols, and haloresorcinols. The primary requirement for the phenolic or halogenated phenolic compound is that it contains at least one hydrogen attached to a ring carbon atom which is ortho or para to the phenolic hydroxyl group. Polymers produced in accordance with this invention contain phosphorus in the trivalent state and this atom can be oxidized with oxidants such as peroxides, perborates, and peracids to the phosphine oxide or pentavalent state.

Suitable solvents for preparing solutions of the phenolic or halogenated phenolic compounds include water, methanol, ethanol, isopropanol and mixtures of these compounds.

Virtually any fibrous organic product capable of being impregnated with the soluble adduct can be made flame resistant by use of this invention. Textiles suitable for use in this invention are woven, knit, or nonwoven structures. For best results, the textile structure should contain at least about 25% of a cellulosic fiber. Cellulosic fibers suitable for use in this invention include, cotton, rayon, ramie, flax, and the like fibers. Various noncellulosic natural fibers can also be used in this invention, such as wool and mohair. Noncellulosic synthetic fibers suitable for use in this invention along with a cellulosic fiber are polyester, nylons, acrylics, polyvinylchloride, and the like fibers. When cellulosic fibers are blended with flammable noncellulosic fibers it is preferable to have about 50% or more cellulosic in the blend structure.

The following examples illustrate but do not limit the scope of this invention.

EXAMPLE 1

The polymers were prepared by reacting the appropriate phosphorus compound with ammonia or other amino compounds as described in Table I. All of the polymers were filtered from the mother liquor, washed with water, ethanol, and methanol before allowing to air dry for eight days. The polymers were then bottled and used to prepare the adduct polymer solutions. In Table II the preparation of the adduct polymer from formaldehyde, tetrakis(hydroxymethyl)phosphonium salt, and polymer are described. The adduct polymer solutions were then mixed with the phenolic or halogenated phenolic compound in an appropriate solvent as described in Table III. These solutions were used to (a) prepare thermosetting or insoluble polymers and (b) produce flame resistant organic fibrous materials. Aliquots of the solutions were heated from about 120°–150° to produce the products which are described in Table IV. To produce flame-resistant organic fibrous materials, the textile structures were impregnated with the solutions described in Table III, then heated to produce insoluble polymers in or on the fibrous structure. In Table V are shown the fibrous materials treated, the solutions of Table III used to treat the fibrous material and a brief description of the product.

Table I

| | Phosphine Polymers | |
|---|---|---|
| Polymer No. | Reactants | %P in Polymer |
| 1 | 1500 g. 40% THPOH (Thpc neutralized with sodium hydroxide); 205 g. ammonium hydroxide (NH$_4$OH, 29% ammonia) | 31.8 |
| 2 | 238 g. Thpc (80%); 238 g. Water; 175 g. NH$_4$OH (29% Ammonia) | 23.4 |
| 3 | 160 g. THP (80%) 200 g Water; 105 g. Hexamethylenetetramine | 29.9 |
| 4 | 573 g. 40% THPOH (Thpc neutralized with sodium hydroxide); 61.2 g. Ethylenediamine (98%) | 29.5 |

Table II

| Designation of Adduct Polymer Solution | Soluble Adduct Polymers Reactants | Time Required for Complete Solution |
|---|---|---|
| A | 80 g. Polymer No. 1; 50 g. THP Acetate (60%)-Phosphate (40%) (60%); 60 g. Formalin (37.5%); 40 g. Water | 4 hours |
| B | 40 g. Polymer No. 2; 25 g. THP Oxalate (70%); 30 g. Formalin (37.5%); 60 g. Water | 4 hours |
| C | 40 g. Polymer No. 3; 20 g. Thpc (80%); 30 g. Formalin (37.5%); 60 g. Water | 4 hours |
| D | 25 g. Polymer No. 4; 25 g. THP Acetate (60%)-Phosphate (40%) (60%); 25 g. Formalin (37.5%); 60 g. Water | 10 hours |

Table III

| Designation of Reactant Solution | Reactant Solutions Composition of Solution |
|---|---|
| E | 20 g. soln. A; 6 g. water; 10 g. ethanol; 4 g. phenol |
| F | 20 g. soln. A; 6 g. water; 10 g. ethanol; 4 g. m-bromophenol |
| G | 20 g. soln. B; 6 g. water; 10 g. ethanol; 4 g. phenol |
| H | 20 g. soln. C; 6 g. water; 10 g. Ethanol; 4 g. Bromohydroquinone |
| I | 20 g. soln. D; 6 g. water; 10 g. ethanol; 4 g. p-bromophenol |

Table IV

Production of Flame Resistant Thermosetting Polymers Through Use of Adduct Polymer Solutions and Phenols

| Reactant Solution Used (Designation from Table III) | Description of Thermosetting Polymer Resulting from Heating the Reactant Solution from about 120–150° C for about 1–10 Minutes |
|---|---|
| E | Clear yellow, hard polymer, insoluble in water and ethanol. Flame- and glow-resistant. Contains nitrogen and phosphorus. |
| F | Clear, red, hard polymer, insoluble in water and ethanol. Flame- and glow-resistant. Contains nitrogen and phosphorus. |
| G | Clear, yellow hard polymer, insoluble in water and ethanol. Flame- and glow-resistant. Contains nitrogen and phosphorus. |
| H | Clear red hard polymer, insoluble in water and ethanol. Flame- and glow-resistant. Contains nitrogen and phosphorus. |
| I | Clear red hard polymer, insoluble in water and ethanol. Flame- and glow-resistant Contains nitrogen and phosphorus. |

Table V

Preparation of Flame Resistant Organic Fibrous Materials

| Fabric Treated | Adduct or Copolymer Solution Applied to Fabric | Conditions for Depositing Insoluble Polymer in Fabric | Approximate Add-On of Retardant After Washing the Treated Textile | Properties of Treated Fabric | | | Match Test Angle |
| --- | --- | --- | --- | --- | --- | --- | --- |
| | | | | Hand | Strength | Color | |
| Cotton Sateen | E | 150° C, 2 Min. | 3.0 | Good | Good | White | 90° |
| Cotton Sateen | F | '' | 3.0 | '' | '' | '' | 90° |
| Cotton Printcloth | G | '' | 13 | Crisp | Fair | Slightly Yellow | 120° |
| PE/Cotton Blend (50/50) | H | '' | 7 | Good | Good | Slightly Brown | 90° |
| Cotton Sateen | I | '' | 17 | Good | Good | Slightly Yellow | 120° |

We claim:

1. A process for preparing a water soluble adduct polymer comprising:
   a. reacting a hydroxymethylphosphorus compound selected from the group consisting of trihydroxymethylphosphene, tetrakis(hydroxymethyl)phosphonium hydroxide and tetrakis(hydroxymethyl)phosphonium chloride with a nitrogenous compound selected from the group consisting of ammonia, hexamethylenetetraamine and ethylenediamine to form an insoluble polymeric precipitate, and
   b. dissolving the precipitate from (a) in the presence of formaldehyde and a hydroxymethylphosphonium compound selected from the group consisting of tetrakis(hydroxymethyl)phosphonium acetate, tetrakis(hydroxymethyl)phosphonium oxalate, and tetrakis(hydroxymethyl)phosphonium chloride with a mole ratio of 1:4 to 4:1 of formaldehyde to phosphorus contained in the precipitate and a 1:10 to 2:1 ratio of phosphonium compound to phosphorus contained in the precipitate.

2. The product prepared by the process of claim 1.

* * * * *